United States Patent
Linhard et al.

(10) Patent No.: US 7,503,616 B2
(45) Date of Patent: Mar. 17, 2009

(54) MOTOR VEHICLE HAVING A MICROPHONE

(75) Inventors: Klaus Linhard, Schelklingen (DE); Norbert Niemczyk, Pforzheim (DE); Christian Weiss, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/590,874

(22) PCT Filed: Feb. 22, 2005

(86) PCT No.: PCT/EP2005/001824

§ 371 (c)(1), (2), (4) Date: Aug. 28, 2006

(87) PCT Pub. No.: WO2005/082669

PCT Pub. Date: Sep. 9, 2005

(65) Prior Publication Data

US 2007/0138825 A1 Jun. 21, 2007

(30) Foreign Application Priority Data

Feb. 27, 2004 (DE) .................. 10 2004 009 700
Apr. 23, 2004 (DE) .................. 10 2004 019 827

(51) Int. Cl.
*B60J 3/00* (2006.01)
(52) U.S. Cl. ........................ 296/97.8; 296/211
(58) Field of Classification Search ........ 296/97.1, 296/97.8, 210, 211
See application file for complete search history.

(56) References Cited

U.S. PATENT DOCUMENTS

| 4,726,620 | A | 2/1988 | Takahashi |
| 6,480,614 | B1* | 11/2002 | Denda et al. .............. 381/423 |
| 6,959,956 | B1* | 11/2005 | Fero et al. ................. 296/97.5 |
| 7,050,593 | B1* | 5/2006 | Emerling et al. ............ 381/86 |
| 7,058,193 | B2 | 6/2006 | Lane |
| 2002/0031234 | A1 | 3/2002 | Wenger et al. |
| 2004/0084936 | A1* | 5/2004 | Umebayashi .............. 296/208 |

FOREIGN PATENT DOCUMENTS

| DE | 93 19 779 U1 | 3/1994 |
| DE | 43 00 433 A1 | 7/1994 |
| DE | 195 39 631 A1 | 5/1996 |
| DE | 297 19 024 U1 | 1/1998 |
| DE | 102 03 599 A1 | 8/2003 |
| EP | 0 629 525 B1 | 12/1996 |
| EP | 0 872 384 A2 | 10/1998 |
| EP | 2001-105989 A | 4/2001 |
| WO | WO 00/48225 A2 | 8/2000 |

* cited by examiner

*Primary Examiner*—Lori L Lyjak
(74) *Attorney, Agent, or Firm*—Patent Central LLC; Stephan A. Pendorf

(57) ABSTRACT

The invention relates to a motor vehicle, in which at least one microphone (8) is mounted in the headlining 94) of a passenger cell of the vehicle. The microphone is mounted in a location, which is concealed by a sun visor (6) that is pivotally mounted on the headlining (4) when said visor has been pivoted to lie against the headlining (4). At least the area (7) of the sun visor (6) that conceals the microphone is configured to conduct sound.

7 Claims, 2 Drawing Sheets

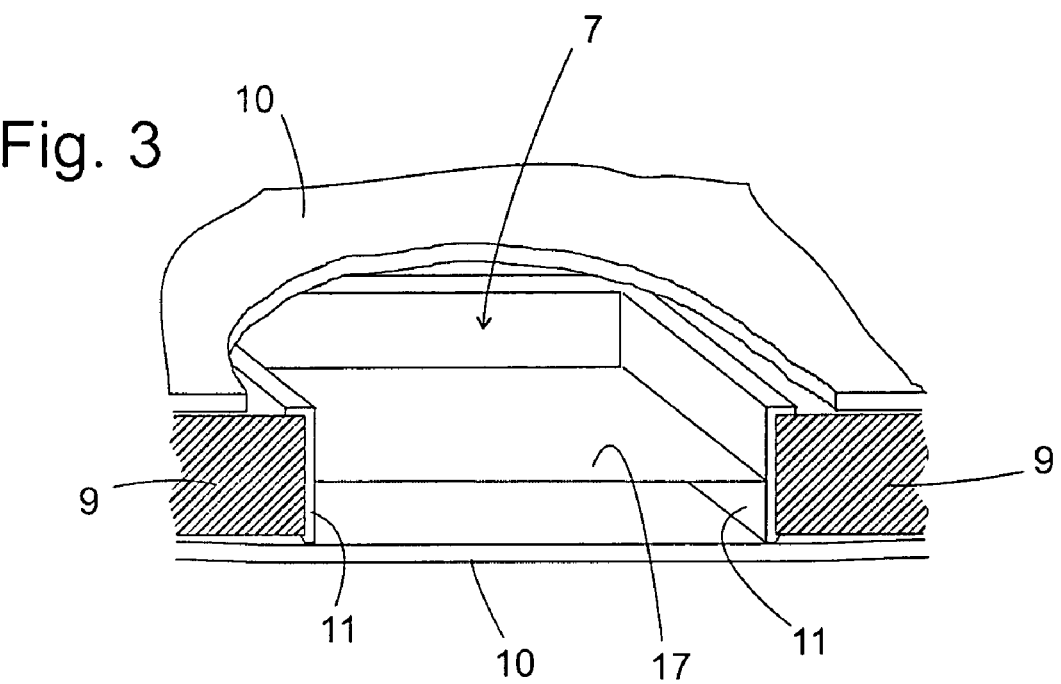

MOTOR VEHICLE HAVING A MICROPHONE

CROSS REFERENCE TO RELATED APPLICATION

Figure 1:
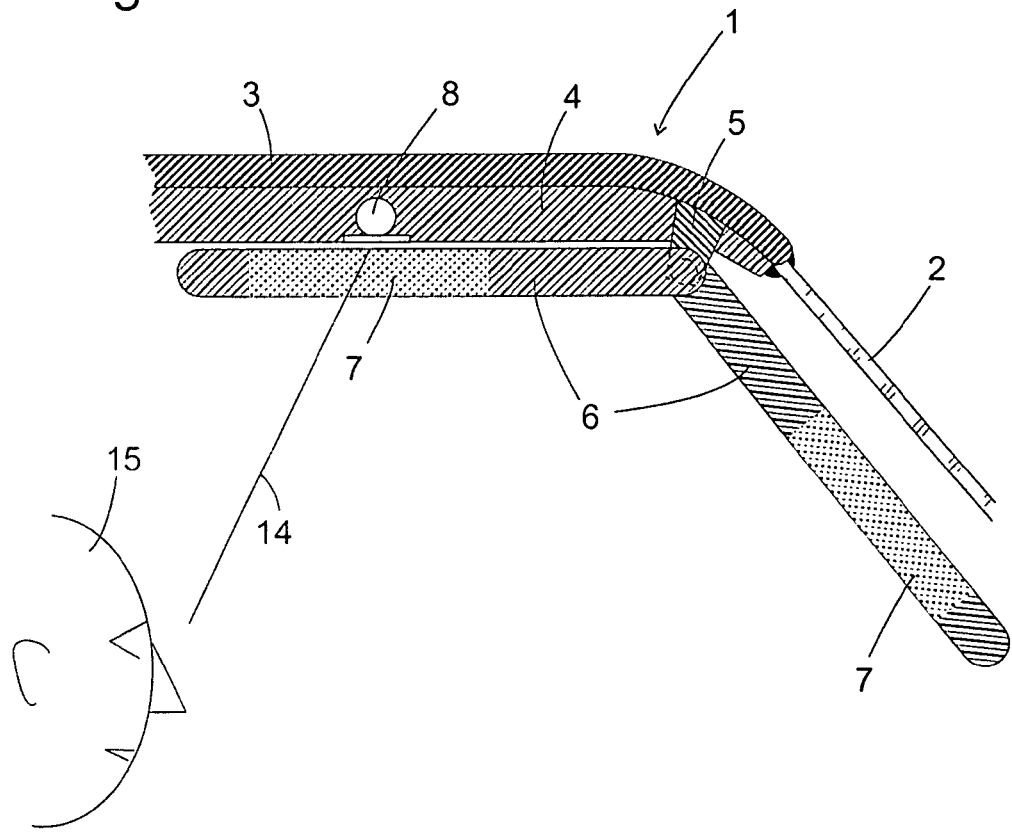

This application is a national stage of PCT/EP2005/001824 filed on Feb. 22, 2005 and based upon Application No. 10 2004 009 700.3 filed Feb. 27, 2004 and Application No. 10 2004 019 827.6 filed Apr. 23, 2004 under the International Convention.

BACKGROUND OF THE INVENTION

1. Field of the Invention

The invention relates to a motor vehicle in which a microphone or a microphone array for a hands-free voice communications system is fitted in a passenger cell. Such hands-free voice communications systems have for some time been the subject of great interest, because their use is statutorily prescribed for the use of a telephone in a moving motor vehicle. The applicability of such a hands-free microphone is not limited to mobile telephony, however. For example, voice signals picked up by the microphone can also be relayed to another part of the vehicle via loudspeakers or may be used by a voice recognition system in order to identify commands spoken into the microphone and to have these commands executed by other vehicle systems.

2. Description of Related Art

A favorable location of the microphone is essential for good-quality registering of the voice. Although fitting it in front of the driver's face would be acoustically advantageous, this has to be ruled out since it obstructs the driver's vision. With a microphone fitted at dashboard height there is the risk that it will sometimes be masked, in particular by the driver's arm movements when steering. Fitting the microphone above head height, to the headliner of the passenger cell, is described, for example, in DE 10203599 A1, JP 2001105989 AH and US 2002/0031234 A1, which discloses a motor vehicle in this field. In particular, US 2002/0031234 gives consideration to the location of a microphone on a console centrally placed on the headliner or on a rear-view mirror fitted to the windshield. Such a location, laterally offset in relation to the normal line of vision and speaking direction of the driver is, however, not ideal from the acoustic standpoint, so that it is proposed, through the use of a microphone array, to arrive at a sensitivity characteristic adjusted to the driver, in order to be able to register his voice with a high level of quality. However, the use of multiple microphones and the in-phase superimposition of the signals delivered by these in order to achieve a directional characteristic make such hands-free voice communications systems costly and expensive.

SUMMARY OF THE INVENTION

The object of the present invention is to specify a motor vehicle having at least one microphone for a hands-free voice communications system, which will provide a simple way of allowing the speech of a vehicle occupant to be registered with a high level of quality.

The object is achieved by a motor vehicle having the features set forth in the claims.

The invention is based on the idea that it would be desirable from an acoustics standpoint to fit the microphone for registering speech in front of and above a vehicle occupant at the smallest possible angle of elevation in relation to the head of the occupant. Since the view through the windshield must not be obstructed, such a microphone must be located on the headliner. From the point of view of a small angle of elevation, it is desirable to fit the microphone to the headliner in proximity to the front edge thereof, but this position is generally occupied by a folding sun visor. Locating the microphone on the actual sun visor has to be ruled out, since such a microphone would deliver useable results only when the sun visor was in a suitable position. A microphone instead mounted in an area of the headliner masked by a stowed sun visor would on the other hand deliver useable results only when the sun visor was folded out. Making the sun visor, at least in its area masking the microphone, sound-permeable in accordance with the invention, however, means that the area of the headliner masked by the stowed sun visor can be used for fitting the microphone. When the sun visor is swung up against the headliner its sound-permeable design allows the microphone to pick up useable voice signals, and when the sun visor is swung out it does not obstruct the microphone in any way.

According to one exemplary embodiment of the invention, a sound-permeable design of the sun visor can be achieved by means of a plurality of air ducts formed in the sun visor.

One possible embodiment of the sound-permeable sun visor according to the invention is created in that in the position in which the sun visor is swung up against the headliner the air ducts run perpendicular to the headliner. In order to ensure that the sound has the maximum possible unimpeded access to the microphone when the sun visor is in the stowed position, however, these air ducts, in the position in which the sun visor is swung up against the headliner, are preferably oriented basically parallel to a line connecting the microphone to the head of a vehicle occupant, so that sound waves emanating from that person can pass through the air ducts basically in the longitudinal direction thereof. However, orientations of the air ducts other than the two aforementioned orientations are also possible in the context of the device according to the invention.

The air ducts of the sound-permeable sun visor may in this connection be designed with different geometric shapes. For example, square, rectangular, triangular, circular or oval design shapes of the air ducts are possible. In the context of the invention, however, a honeycomb structure of the air ducts is preferred. In order to ensure that no light can pass through the air ducts to dazzle the vehicle occupant(s) when the sun visor is in a swung-out position, the length of the ducts is preferably greater than their width dimensions or greater than the diameter thereof in the case of circular air ducts. Making the length of the air ducts greater than their width dimensions means that the air ducts have an effect comparable to that of a Venetian blind vis-à-vis optical radiation.

Instead of air ducts the device according to the invention may also simply take the form of at least one flat lattice structure, such as wire mesh and/or a perforated plate, for example. The flat lattice structure or the perforated plate is in this case inserted centrally in the sound-permeable area, for example. It is also possible, however, to fit the flat lattice structure or the perforated plate to the surfaces on both sides of the sun visor in the sound-permeable area thereof.

According to a further development the sun visor has an opaque membrane in its sound-permeable area. This can readily be made so thin and flexible that it does not significantly impede the transmission of sound.

The sound-permeable area of the sun visor is furthermore preferably provided with a textile cover. Such a cover conceals the sound-permeable area so that in appearance a sun visor designed according to the invention is virtually indistinguishable from a conventional sun visor.

The subject matter of the invention is also a sun visor such as has been described above.

Figure 2:
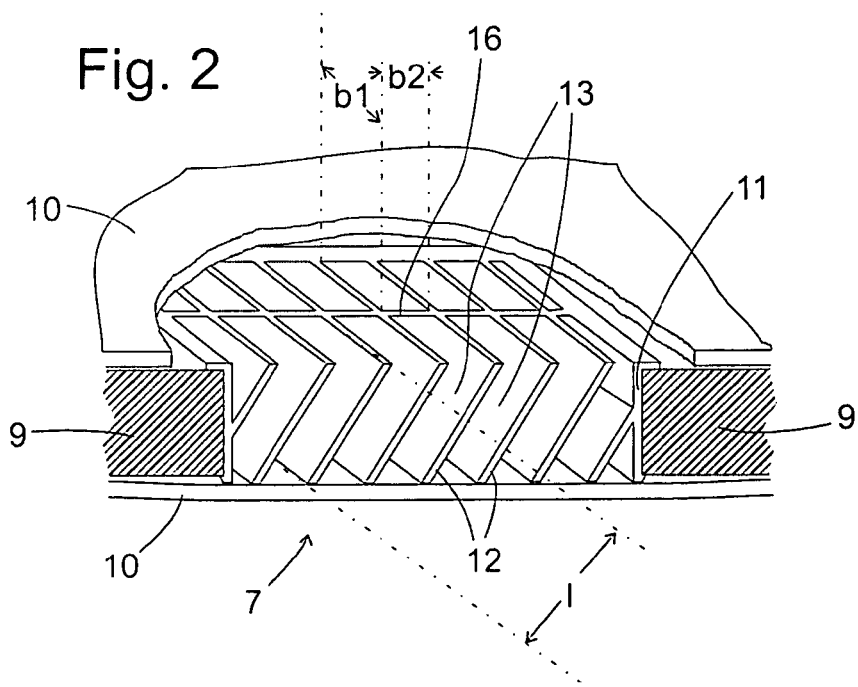

Further features and advantages of the invention are set forth in the following description of exemplary embodiments, referring to the drawings attached, in which:

FIG. 1 shows a schematic section through the front edge area of the headliner and the adjoining windshield in a motor vehicle according to the invention;

FIG. 2 shows the structure of a sun visor according to a first development of the invention; and FIG. 3 shows the structure of a sun visor according to a second development of the invention FIG. 1 shows a section parallel to the direction of travel through the front edge area of the roof 1 of a vehicle body and the adjoining windshield 2. The outer skin of the roof 1 is formed by a roof panel 3, on the underside of which a flexible lining forms a headliner 4. A hinge part 5, to which a sun visor 6 is pivotally attached, is fixed to the headliner 4 in proximity to the front edge of the roof 1 or, as indicated here, is fixed to the roof panel 3 through a recess in the headliner 4.

The sun visor 6 can be pivoted between two limit positions each represented in the drawing, one bearing on the headliner 4 and one approximately parallel to the windshield 2. Formed in the lamellar body of the sun visor 6 is a sound-permeable but opaque window 7, which in the extreme position of the sun visor 6 bearing on the headliner 4 comes to rest in front of a microphone 8 sunk into the headliner 4. Sounds emitted by a speaker seated on a seat in the passenger cell, to which the sun visor 6 is assigned, can reach the microphone 8 largely unattenuated through the window 7.

FIG. 2 shows a detailed, partially sectional and partially perspective view of the structure of the sun visor 6 and its window 7 according to a first development of the invention. The sun visor 6, in a manner known in the art, has a lamellar core 9 composed of a rigid material, which is deformable within limits and is covered with a textile covering 10. In the drawing the covering 10 is shown partially cut away, so that the structure of the sound-permeable window 7 is visible in detail. The window 7 is here formed by a frame 11, which is fixed, for example latched, in an opening cut into the core 9. The inside of the frame 11 is filled by a number of parallel slats 12, between which continuous ducts 13 extend from one side of the textile covering 10 to the other. The orientation of the slats 12 is approximately parallel to an imaginary connecting line 14, shown in FIG. 1, between the microphone 8 and the head 15 of a vehicle occupant, whose speech is to be registered by the microphone 8. The slats 12 are connected to one another and reinforced by a plurality of parallel cross-slats 16, of which only one is shown in FIG. 2.

The length 1 of the ducts 13 is greater than their cross section, which is obtained from the respective width dimensions b1, b2. This ensures that light can pass through the ducts 13 only at a very small angle of incidence without striking the darkly colored slats 12, 16 and being absorbed on these. The inclined position of the slats 12 parallel to the connecting line 14 is achieved in that in the limit position of the sun visor 6 parallel to the windshield 2 these slats run sloping from back to front, so that light incident upon the sun visor 6 from above the horizon and passing through the covering 10 is absorbed on one of the slats 12.

The frame 11 is for preference inexpensively formed in one piece together with the slats 12, 16 as an injection molded plastic part.

In the development of the sun visor 6 shown in FIG. 3 an opening, which forms the window 7, is again cut into the core 9 covered with a textile covering 10. In addition, a thin membrane 17 composed of a plastic film, rendered opaque by tinting or metallization can be held in a frame 11, inserted into the opening, approximately centrally between the two sides of the covering 10 and thus protected from physical damage by the covering 10. The highly flexible membrane 17 in this case does not produce any significant attenuation of the sound, so that in this case also a microphone 8 in the headliner masked by the sun visor 6 can pick up voice signals with a high level of quality.

Compared to conventional locations for microphones in the area of the rear-view mirror or on a roof console, a microphone located according to the invention is capable of obtaining an approximately 5 dB better signal-to-noise ratio at a road speed of 100-130 km/h. Such an improvement is achievable at conventional microphone installation positions only if a single microphone is replaced, for example, by an expensive microphone array having a directional characteristic adjusted to a speaker. By contrast, the proposed solution is substantially simpler and less expensive. Instead of a single microphone, however, an entire microphone array can obviously also be installed on the headliner masked by a sound-permeable sun visor, in order thereby to obtain a further improvement in the signal-to noise ratio. Such a sun visor may than be provided with a plurality of sound-permeable windows each assigned to different microphones in the array.

The sun visor could naturally also be made sound-permeable over its entire surface, for example by replacing the entire core 9 with intersecting slats 12, 16 whilst retaining the external design shape.

Since the sound-permeable sun visors described above do not differ in their external appearance from conventional sun visors, they can also replace the latter in vehicles which have no hands-free microphone whatsoever at a point on the headliner masked by the stowed sun visor. By dispensing in vehicle production with the conventional sun visors in favor of the at least locally sound-permeable sun visors described above, it is possible to reduce the number of components needed in vehicle production and to reduce the costs of production.

The invention claimed is:

1. A motor vehicle having at least one microphone (8) fitted to a headliner (4) of a vehicle occupant cell of the vehicle and at least one sun visor (6) pivotally fitted to the headliner (4), wherein the microphone (8) is located at a point on the headliner (4) at which the microphone (8) is masked by the sun visor (6) in a position swung up against the headliner (4), and wherein the sun visor (6) is sound-permeable at least in its area masking the microphone (8), wherein the sun visor (6) has a plurality of air ducts (13) in its sound-permeable area (7), and wherein in the position in which the sun visor (6) is swung up against the headliner (4) the air ducts (13) are oriented basically parallel to a line (14) connecting the microphone to the head (15) of an occupant.

2. A motor vehicle having at least one microphone (8) fitted to a headliner (4) of a vehicle occupant cell of the vehicle and at least one sun visor (6) pivotally fitted to the headliner (4), wherein the microphone (8) is located at a point on the headliner (4) at which the microphone (8) is masked by the sun visor (6) in a position swung up against the headliner (4), and wherein the sun visor (6) is sound-permeable at least in its area masking the microphone (8), wherein the sun visor (6) has a plurality of air ducts (13) in its sound-permeable area (7), and wherein in the position in which the sun visor (6) is swung up against the headliner (4) the air ducts (13) are oriented basically parallel to a line (14) connecting the microphone to the head (15) of an occupant, and wherein said air ducts form a honeycomb structure.

3. The motor vehicle as claimed in claim 2, wherein the length (l) of the air ducts (13) is greater than their width dimensions (b1, b2).

4. The motor vehicle as claimed in claim 1, wherein the sun visor (6) has at least one of at least one flat lattice structure and at least one perforated plate in its sound-permeable area (7).

5. The motor vehicle as claimed in claim 1, wherein sun visor (6) has an opaque membrane (17) in its sound-permeable area (7).

6. The motor vehicle as claimed in claim 1, wherein the sound-permeable area (7) is provided with a textile covering (10).

7. A sun visor for a motor vehicle having at least one microphone (8) fitted to a headliner (4) of a vehicle occupant cell of the vehicle, the sun visor (6) pivotally fitted to the headliner (4) masking the microphone (8) when in a position swung up against the headliner (4), wherein the sun visor (6) is sound-permeable at least in its area masking the microphone (8), wherein the sun visor (6) has a plurality of air ducts (13) in its sound-permeable area (7), and wherein in the position in which the sun visor (6) is swung up against the headliner (4) the air ducts (13) are oriented basically parallel to a line (14) connecting the microphone to the head (15) of an occupant.

* * * * *